United States Patent [19]

Lund

[11] Patent Number: 5,042,524

[45] Date of Patent: Aug. 27, 1991

[54] DEMAND RECOVERY HOT WATER SYSTEM

[75] Inventor: William J. Lund, Stockton, Calif.

[73] Assignee: Metlund Enterprises, Stockton, Calif.

[21] Appl. No.: 562,894

[22] Filed: Aug. 3, 1990

Related U.S. Application Data

[63] Continuation-in-part of Ser. No. 414,394, Sep. 29, 1989, Pat. No. 4,945,942.

[51] Int. Cl.⁵ .................................................. F16K 49/00
[52] U.S. Cl. ....................................... 137/337; 126/362; 417/32
[58] Field of Search .................... 126/362; 417/12, 32; 137/337; 237/19

[56] References Cited

U.S. PATENT DOCUMENTS

| | | | |
|---|---|---|---|
| 2,842,155 | 7/1958 | Peters | 137/337 |
| 3,144,904 | 8/1964 | Kahn | 165/73 |
| 4,142,515 | 3/1979 | Skaats | 126/362 |
| 4,160,461 | 7/1979 | Vataru et al. | 137/337 |
| 4,201,518 | 5/1980 | Stevenson | 417/32 |
| 4,257,745 | 3/1981 | Thur et al. | 417/32 |
| 4,286,573 | 9/1981 | Nickel | 126/362 |
| 4,321,943 | 3/1982 | Haws | 137/337 |
| 4,391,295 | 7/1983 | Stipe | 137/522 |
| 4,518,007 | 5/1985 | Haws | 137/337 |
| 4,697,614 | 10/1987 | Powers et al. | 137/337 |
| 4,750,472 | 6/1988 | Fazekas | 126/362 |
| 4,798,224 | 1/1989 | Haws | 137/337 |
| 4,930,551 | 6/1990 | Haws | 137/337 |

FOREIGN PATENT DOCUMENTS 469846 12/1946 Canada .

Primary Examiner—A. Michael Chambers
Attorney, Agent, or Firm—Walter A. Hackler

[57] ABSTRACT

A demand recovery hot water system in accordance with the present invention provides for return of hot water from a plurality of plumbing fixtures to a hot water source. A transfer tank is provided with a movable piston which enables circulation of hot water without significant loss thereof. Continuous circulation is not required thus reducing operating costs.

10 Claims, 2 Drawing Sheets

DEMAND RECOVERY HOT WATER SYSTEM

This application is a continuation-in-part of U.S. Ser. No. 07/414,394, filed Sept. 29, 1989, now U.S. Pat. No. 4,945,942.

The present invention is generally directed to plumbing systems and more particularly directed to a circulating hot water plumbing system of high thermal efficiency As described in U.S. Pat. Nos. 4,321,943 and 4,798,224, a considerable amount of thermal energy may be wastefully dissipated from hot water lines which provide hot water to plumbing fixtures, such as domestic wash basins, dishwashers and clothes washers In addition, if water is allowed to run down the drain while waiting for hot water to be delivered to the fixture from a remote hot water source, a substantial water loss may occur.

In order to reduce such water loss, plumbing systems have been devised which continuously circulate hot water from a hot water source to the fixture and back to the hot water source. In this arrangement, a supply of hot water is always adjacent a plumbing fixture despite the remote position of the hot water source. The water loss is then limited to the amount of cold water disposed in draw pipes interconnecting the plumbing fixture to the hot water conduit in which hot water is circulated.

While this system substantially reduces the amount of water which must be withdrawn from the fixture before suitable hot water is obtained, it is not energy efficient because the array of pipes interconnecting the plumbing fixtures in the hot water source provide an enormous surface area for thermal radiation therefrom. In addition, the electrical cost of running a circulating pump may cause such system to be prohibitive in view of the latest energy conscious code requirements of most governmental agencies.

Thermal losses in both circulating and non-circulating plumbing systems have been reduced by insulation of the hot water lines as well as the hot water heaters which feed the plumbing fixtures. While such insulation slows the dissipation of heat, no savings occur over an extended period of time in non-circulating systems as intermittent use of hot water through the lines still allows hot water to cool to ambient temperature. In circulating systems, of course, there is a continual thermal loss.

With specific reference to non-circulating systems, devices have been developed to actually recover the hot water remaining in the hot water lines after the use of a fixture by drawing the hot water back into the hot water tank, see for example, U.S. Pat. Nos. 4,321,943 and 4,798,224. Because hot water is removed from the lines, there is an actual reduction in the amount of heat loss rather than just a slowing of heat loss as occurs through the use of insulation alone.

The present invention is directed to an accelerated hot water delivery system which substantially reduces thermal losses by providing intermittent circulation through the hot water lines. Further, apparatus in accordance with the present invention, may include hot water recovery apparatus to remove hot water intermittently circulated within the hot water conduit lines in order to complement the thermal efficiency of the system.

SUMMARY OF THE INVENTION

A demand recovery hot water system in accordance with the present invention generally includes a hot water source and conduit means, in fluid communication with the hot water source and at least one plumbing fixture, for enabling circulation of hot water from the hot water source to the plumbing fixture and return to the hot water source. In this manner, a ready source of hot water may be provided at all times adjacent to the plumbing fixture so that water usage is substantially reduced.

Means are provided for circulating hot water through the conduit means and control switch means are included for generating a control signal. Control means are provided for causing the pump means to circulate hot water from the hot water source through the conduit means to the plumbing fixture and from said plumbing fixture to said hot water source in response to the control signal. Thus, according to the present invention, hot water is not continuously circulated through the conduit means.

More particularly, the present invention includes hot water recovery means, in fluid communication with the hot water source and the conduit means, for receiving water circulated through the conduit means and returning the circulated water into the conduit means for returning to the hot water source.

The hot water recovery means may be disposed within the hot water source itself or separate therefrom and may include a transfer tank having a first and a second inlet. The first inlet may be in fluid communication with the hot water source and the second inlet in fluid communication with the conduit means.

The transfer tank may include a movable piston, disposed between the first and second inlets, for separating the transfer tank into a first and a second compartment. The movable piston is further operable for displacing water in the first compartment into the hot water source as water flows into the second compartment from the conduit means and for displacing water in the second compartment into the conduit means as water flows into the first compartment from the hot water source.

BRIEF DESCRIPTION OF THE DRAWINGS

The advantages and features of the present invention will appear from the following description when considered in conjunction with the accompanying drawings in which.

DETAILED DESCRIPTION OF THE DRAWING

Figure 1:
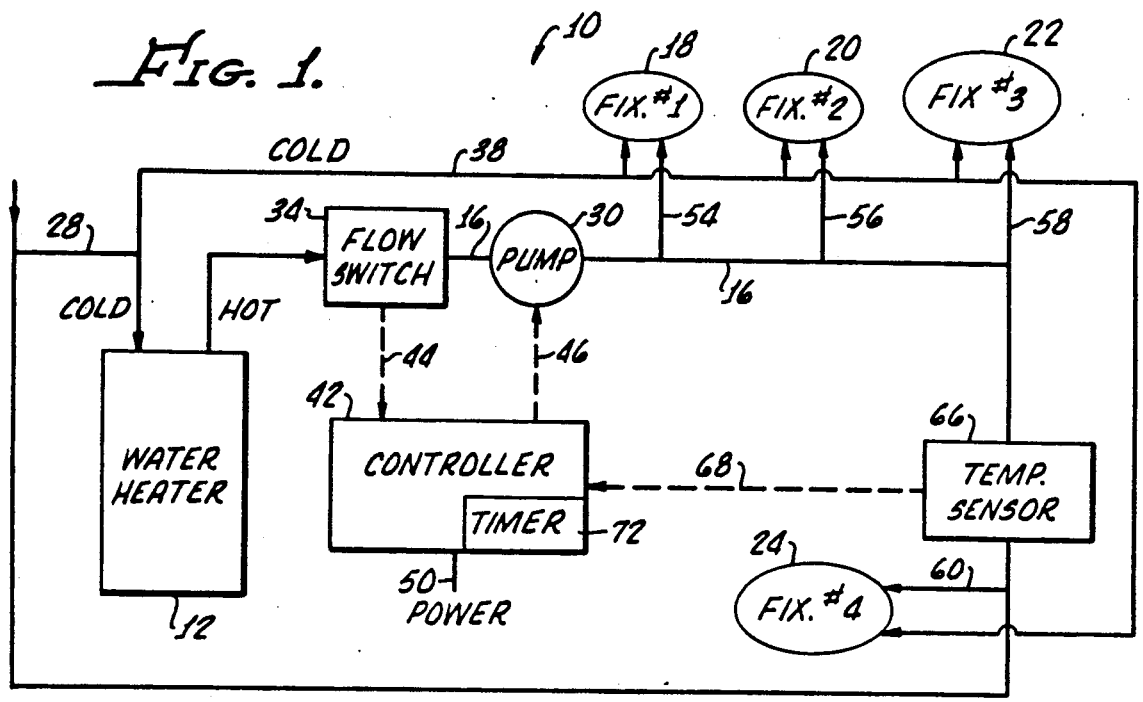
FIG. 1 is a flow diagram of a plumbing system in accordance with the present invention, generally showing a hot water source and conduit means, in communication with at least one plumbing fixture, along with a pump, a flow switch and a controller.

Turning now to FIG. 1, there is shown a plumbing system 10 which generally includes a hot water source such as a gas or electric water heater 12 interconnected by means of pipes 16 with water fixtures 18, 20, 22, 24, which provides a conduit means for enabling circulation of hot water from the hot water source 12 to each of the plumbing fixtures 18, 20, 22, 24 and return to the hot water source 12.

The hot water heater 12 may be of conventional construction and connected to a cold water source through inlet pipe 28. A conventional pump 30 is installed in the pipe 16 and provides means for circulating hot water through the pipe 16. When not operating, the pump 30 allows reverse water flow therethrough in connection with the operation of the plumbing system 10, as will be hereinafter described in greater detail. A flow switch 34 is installed in the pipe 16 and may be of conventional construction for providing a means for generating a signal, such as, for example, an electrical signal, in response to water flow in the pipe 16.

Each of the plumbing fixtures 18, 20, 22 and 24 are interconnected to the cold water line 28 via a feed line 38.

A controller 42 which may be of any conventional mechanical and/or electrical design is interconnected with the flow switch 34 and the pump 30 by lines 44, 46, respectively, and provides means for causing the pump means to circulate hot water through the pipe 16 in response to the flow switch means signal and for stopping the pump means.

As would typically be the case, the pump 30 may include an electrical motor (not separately shown) and the controller 42 operates through an electrical signal from the flow switch 34 through the line 44 to connect and disconnect the pump 30 with a power source 50.

Hence, when fixtures 18 and 20, 22, 24 are not drawing water from the pipe 16, the controller prevents circulation of water through the pipe 16, conserving electrical energy. When, however, water is drawn from one of the fixtures 18, 20, 22, 24, it is sensed by the flow switch 34 which provides a signal to the controller 42 to energize the pump 30 to rapidly circulate water through the pipe 16. The fixtures 18, 20, 22, 24 may include communication with the pipe 16 through draw pipes 54, 56, 58, 60 and in order that the circulation of water through the pipe 16 be substantially greater than that drawn through anyone of the draw pipes 54, 56, 58, 60, the pipe 16 may have a substantially larger diameter than the draw pipe 54, 56, 58, 60. As, for example, the pipe 16 may be of conventional 3/4 inch American Standard pipe size while the draw pipes 54, 56, 58, 60 may be 1/2 inch American Standard pipe.

In order to prevent continued circulation of water through the pipe 16 after hot water is delivered to any one or more of the fixtures 18, 20, 22, 24, a temperature sensor 66, which may be of any conventional construction, may be installed in the pipe 16 for providing means for generating a signal in response to sensing a selected water temperature in the conduit means. Correspondingly, the controller 42 may include conventional electrical circuitry for responding to the signal sent thereto over a line 68 in order to stop the pump 30. It should be clear that as water is drawn from anyone of the fixtures, the pump 30 circulates water through the pipe 16 and such circulation is unnecessary after hot water is delivered to the fixture at a selected water temperature. It is stopped by the operation of the temperature sensor 66 and controller 42. Again, this feature conserves electrical energy.

Alternatively, a conventional electrical or mechanical timer 72, which may be incorporated into the controller or disposed separately therefrom, may be provided, in order to stop the pump after a selected period of time. In this embodiment, upon installation of the plumbing system 10, water temperature measurements versus time can be made during the draw of hot water from anyone of the fixtures 18, 20, 22, 24 and on the basis of such data, an appropriate time selected to enable the pump 30, to circulate hot water to all of the fixtures 18, 20, 22 and 24.

While the timer 72 may be disposed anywhere within the system, it is preferred that the temperature sensor 66 be disposed along the conduit adjacent the most remote fixture 24 from the hot water heater 12.

Figure 2:
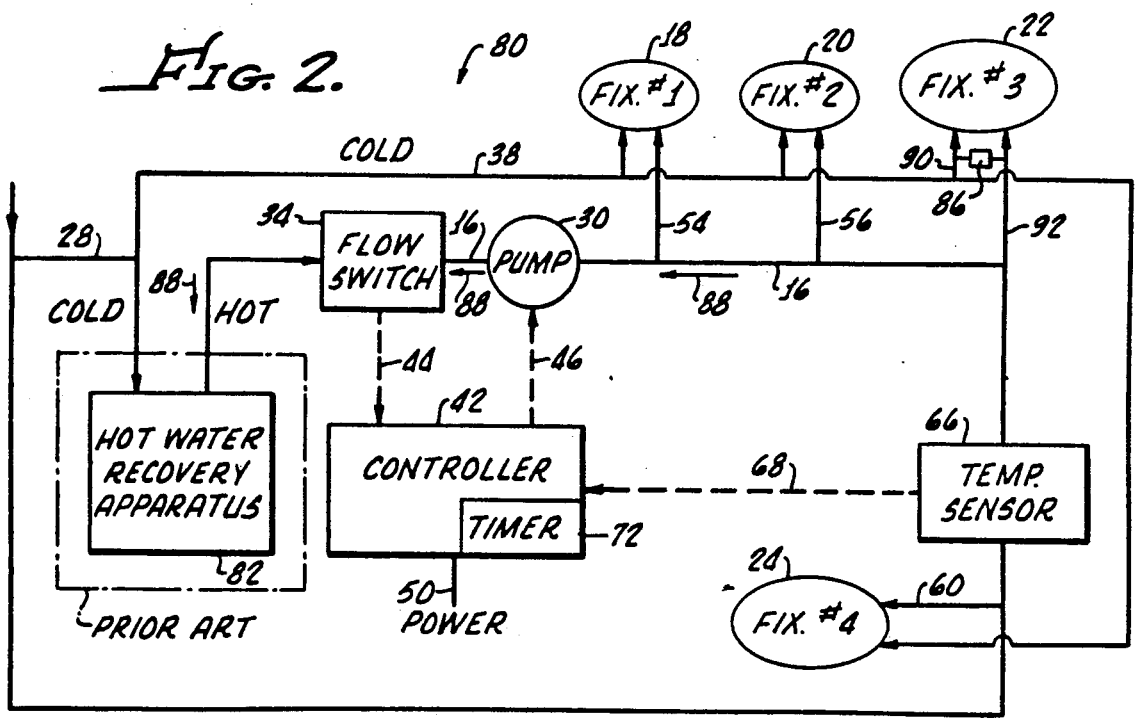
FIG. 2 is a flow diagram of a plumbing system in accordance with the present invention further including hot water recovery apparatus.

Turning now to FIG. 2 there is shown another embodiment of the present invention in which a plumbing system 80 incorporates hot water recovery apparatus 82 as hereinafter described. Similar or equivalent components of the plumbing system 80 are identified with the same character references used to identify corresponding components in the plumbing system 10. The hot water recovery apparatus 82 may be as described in U.S. Pat. Nos. 4,321,941 and 4,798,224, these patents being incorporated herein by specific reference thereto for the purpose of identifying and describing such hot water recovery apparatus. Details of their operation are only summarized herein for the sake of clarity.

Generally, the hot water apparatus 82 operates in cooperation with a one-way valve 86 interconnecting valve 86 interconnecting a cold water draw line 90 and a hot water draw line 92 approximate the selected fixture 22. As described in U.S. Pat. No. 4,321,943 and/or U.S. Pat. No. 4,798,224, the hot water recovery apparatus 18 functions to pull hot water from the pipe 16 following termination of water flow through anyone of the fixtures 18, 20, 22, 24 via the one-way valve 86 interconnected between the draw lines 90, 92. A pressure differential created between the cold water line 38 and the hot water pipe 16 causes a water flow through the one-way valve 86 from the cold water line 38 into the hot water line 16 and back into the hot water recovery apparatus 82 as indicated by the arrows 88.

Figure 3:
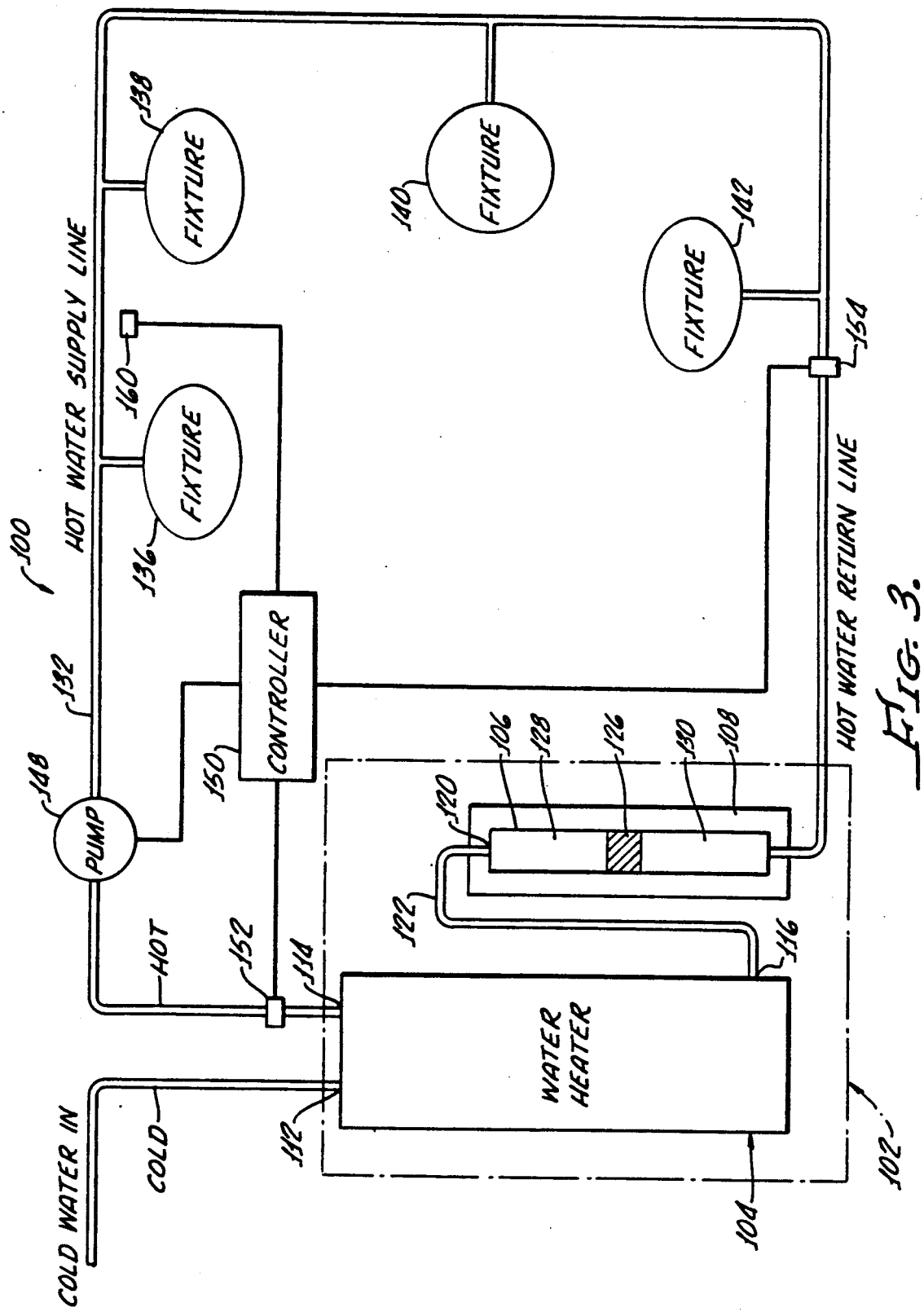
FIG. 3 is a flow diagram of an alternate embodiment of the present invention.

Turning now to FIG. 3, there is shown an alternative embodiment of the present invention, namely, a demand recovery hot water system 100 which generally includes a hot water source 102 which may include a water heater tank 104 and a transfer tank 106. It is to be appreciated that the transfer tank 106 may be disposed within the hot water source 102 as shown within the dashed lines, or be separate therefrom. In the latter embodiment, shown in solid line, the storage tank would be surrounded by appropriate insulation 108 to reduce thermal loss.

The water heater tank 104 includes a cold water inlet 112, a hot water outlet 114 and a return water inlet 116, the latter being interconnected with a first inlet 120 of the transfer tank 106 via a conduit 122. It should be noted that if the transfer tank 106 and conduit 122 are disposed within the hot water source 102, separate insulation 108 is not necessary.

A movable piston 126 is disposed within the transfer tank, which may be cylindrical in shape, for separating the transfer tank 106 into a first compartment 128 and a second compartment 130, the compartments 128, 130 being sealed from one another by the movable piston 126.

A conduit 132, interconnected with the hot water outlet 114, plumbing fixtures 136, 138, 140, 142 and a second inlet 146 of the transfer tank 106, provides means for enabling circulation of hot water between the water heater 114, the plumbing fixtures 136, 138, 140, 142 and the transfer tank 106.

A reversible pump 148 disposed in the conduit 132 provides means for circulating hot water through the conduit 132 and a controller 150, in electrical communication with the pump 148, a flow sensor 152 and a temperature sensor 154 causes the pump 148 to circulate water from the water heater 104 to the transfer tank 106 and from the transfer tank 106 to the water heater 104.

The controller 150 as well as the sensors 152, 154 may be of conventional design suitable for use in the system of the present invention.

In operation when a user of the system 100 activates the system, by either turning on a fixture 136, 138, 140, 142 causing the sensor to generate a control signal in response thereto, or by manually activating a switch 160 interconnected with the controller 150, the controller activates the pump to circulate hot water from the water heater 104 into the conduit 132 past the fixtures 136, 138, 140, 142, and toward the transfer tank 106. When this occurs, the piston is moved from an initial position, B, toward position A, displacing water in compartment 128 into the water heater 104. As a result, hot water is more quickly transferred to the fixtures 136, 138, 140, 142 in use with less water being poured down a drain.

After a selected period of time, or when sensor 154 measures a selected water temperature, the controller 150 stops the pump enabling water flow to continue through the pump by conventional water supply pressure.

After a second select period of time, or by manual operation of the switch 160, the controller 150 reverses the pump 148, causing water to be pumped from the second compartment 130 of the transfer tank 106 back into the water heater 102. The piston 186 then displaces water in the second compartment 130 as water flows into the first compartment 128 from the water heater 104 and the piston 126 returns to position B.

In this manner the hot water initially circulated to the fixture 136, 138, 140, 142, is returned to the water heater 104 thereof, saving the heat energy in the conduit 132.

An advantage of the system 100 over the system 10 is that hot water can be returned to the water heater 104 more rapidly because no flow control valve 86 is required which causes cold water to enter the conduit 38.

The amount of hot water that can be returned may be determined by the size of the transfer tank 106. Hence, all the hot water in the conduit 132 cab be recovered.

Another significant feature of the present invention is that the pump operates only on an interconnected basis, thereby significantly reducing electrical consumption.

Although there has been hereinabove described a particular arrangement of an actuated hot water delivery system in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the invention as defined in the appended claims.

What is claimed is:

1. A demand recovery hot water system comprising:
   a hot water source;
   conduit means, in fluid communication with said hot water source and at least one plumbing fixture, for enabling circulation of hot water from said hot water source to said plumbing fixture and return to said hot water source;
   pump means for circulating hot water through the conduit means;
   switch means for generating a control signal;
   control means for causing said pump means to circulate hot water through the conduit means from said hot water source to said plumbing fixture and from said plumbing fixture to said hot water source in response to the control signal; and
   hot water recovery means, in fluid communication with said hot water source and said conduit means, for accumulating water circulated through said conduit means and thereafter returning the accumulated water into the conduit means for return to the hot water source.

2. The system according to claim 1 wherein said hot water recovery means includes a transfer tank having a first and a second inlet, said first inlet being in fluid communication with said hot water source, said second inlet being in fluid communication with said conduit means, said transfer tank comprising movable piston means, disposed between said first and second inlets, for separating said transfer tank into a first and a second compartment, for displacing water in the first compartment into the hot water source as water flows into the second compartment from the conduit means and for displacing water in the second compartment into the conduit means as water flows into the first compartment from the hot water source.

3. The system according to claim 2 wherein said transfer tank is disposed within said hot water source.

4. The system according to claim 2 wherein said transfer tank is separate from said hot water source.

5. A demand recovery hot water system comprising:
   a hot water source;
   conduit means, in fluid communication with said hot water source and at least one plumbing fixture, for enabling circulation of hot water from said hot water source to said plumbing fixture and return to said hot water source;
   pump means for circulating hot water through the conduit means;
   flow switch means for generating a signal in response to water flow in said conduit means;
   control means for causing said pump means to circulate hot water through the conduit means from said hot water source to said plumbing fixture in response to the flow switch means signal, said control means including timing means for causing the control means to reverse the pump means in order to circulate hot water from the plumbing fixture to the hot water source; and
   hot water recovery means, in fluid communication with said hot water source and said conduit means, for accumulating water circulated through said conduit means and thereafter returning the accumulated water into the conduit means for return to the hot water source.

6. The system according to claim 5 wherein said hot water recovery means includes a transfer tank having a first and a second inlet, said first inlet being in fluid communication with said hot water source, said second inlet being in fluid communication with said conduit means, said transfer tank comprising movable piston means, disposed between said first and second inlets, for separating said transfer tank into a first and a second compartment, for displacing water in the first compartment into the hot water source as water flows into the second compartment from the conduit means and for displacing water in the second compartment into the conduit means as water flow into the first compartment from the hot water source.

7. The system according to claim 6 wherein said transfer tank is disposed within said hot water source.

8. The system according to claim 6 wherein said transfer tank is separate from said hot water source.

9. A demand recovery hot water system comprising:
a water heater including a tank with a cold water inlet, a hot water outlet and a return water inlet;
a transfer tank having a first and a second inlet, said first inlet being in fluid communication with the water heater return water inlet, said transfer tank comprising movable piston means, disposed between said first and second inlet, for separating said transfer tank into a first and a second compartment, for displacing water in the first compartment into the water heater, through the return inlet thereof, as water flows into the second compartment and for displacing water in the second compartment as water flows into the first compartment from the water heater;
conduit means, in fluid communication with said water heater hot water outlet, at least one plumbing fixture and the transfer tank second inlet, for enabling circulation of hot water between said water heater, said plumbing fixtures and said transfer tank;
pump means for circulating hot water through the conduit means; and
control means for causing said pump means to circulate water from the water heater to the transfer tank and subsequently from the transfer tank back to the water heater.

10. The system according to claim 9 wherein said transfer tank is disposed within said water heater.

* * * * *